United States Patent [19]

Piper

[11] 3,917,671

[45] Nov. 4, 1975

[54] LIGHT STABLE BISMUTH OXYCHLORIDE AND PROCESS FOR PREPARING SAME

[75] Inventor: Roger D. Piper, Des Peres, Mo.

[73] Assignee: Mallinckrodt, Inc., St. Louis, Mo.

[22] Filed: Feb. 6, 1974

[21] Appl. No.: 440,234

[52] U.S. Cl. .................................. 423/472; 423/617
[51] Int. Cl.² .................. C01G 29/00; C01B 11/00
[58] Field of Search ............................ 423/472, 617

[56] References Cited
UNITED STATES PATENTS
3,798,313  3/1974  Wetzold .............................. 423/617

OTHER PUBLICATIONS

J. W. Mellor's, "A Comprehensive Treatise on Inorganic and Theoretical Chemistry," Vol. 9, 1929, pp. 679 and 680, Longmans, Green & Co., New York, Copy in Scient. Lib.

*Primary Examiner*—Edward Stern
*Attorney, Agent, or Firm*—R. J. Klostermann; L. N. Goodwin

[57] ABSTRACT

Bismuth oxychloride stabilized against light is obtained by heating the bismuth oxychloride at a temperature in the range of from about 300° to about 800° C. for a period of time sufficient to stabilize the bismuth oxychloride. Light stable bismuth oxychloride in pearlescent form produced by this process is useful in cosmetic products.

7 Claims, No Drawings

LIGHT STABLE BISMUTH OXYCHLORIDE AND PROCESS FOR PREPARING SAME

BACKGROUND OF THE INVENTION

1. Field of the Invention

This invention relates to light stable bismuth oxychloride. In a particular aspect this invention relates to light stable nacreous bismuth oxychloride and to a process for preparing same. In a more particular aspect this invention relates to a process for preparing light stable nacreous bismuth oxychloride by heating the bismuth oxychloride at a temperature in the range of from about 300° to about 800° C.

2. Description of the Prior Art

Because it possesses a high index of refraction and is available in pearlescent form, bismuth oxychloride is widely used as a nacreous or pearlescent pigment in cosmetic products such as lipstick, eye shadow, rouge and nail polish. The principal drawback in the use of nacreous bismuth oxychloride in such cosmetic products is that the material tends to lose its characteristic white color and darkens on exposure to light, particularly ultraviolet light. Several procedures have been employed in an attempt to minimize the tendency of bismuth oxychloride to materially darken on exposure to light. One such procedure involves using special and expensive packaging materials for the product which serve to screen out light. Another commonly employed procedure involves the addition of light stabilizing materials to the bismuth oxychloride pigment. Such a procedure and the materials employed therein are described, for example, in U.S. Pat. No. 2,974,053, issued Mar. 7, 1961 to Lawrence Suchow. While the use of additives has proven reasonably successful in serving to stabilize bismuth oxychloride products against light deterioration, the incorporation of such additives in cosmetic products in turn presents additional drawbacks, the principal of which arises from the adulteration of the bismuth oxychloride material. An additional disadvantage, of course, is that such additives are expensive and thereby add to the ultimate cost of the cosmetic product.

SUMMARY OF THE INVENTION

It is an object of the present invention to provide nacreous bismuth oxychloride which remains stable even after prolonged exposure to light.

It is a further object of the present invention to provide a process for stabilizing nacreous bismuth oxychloride against light, principally ultraviolet light, without the need for incorporating light stabilizing additives into the bismuth oxychloride material.

Other objects and advantages of the present invention will be apparent from the specification and appended claims.

The present invention resides in the discovery that the stability of bismuth oxychloride is significantly improved by heating bismuth oxychloride at a temperature in the range of from about 300° to about 800° C. for a period of time sufficient to stabilize the bismuth oxychloride against light deterioration but insufficient to cause significant sintering of the bismuth oxychloride. While not being limited to any particular theory it is believed that the process of the present invention is effective in stabilizing plate-like crystals of bismuth oxychloride against light deterioration by substantially eliminating discontinuities in the fine structure of the crystalline platelets. It has been theorized that small defects or discontinuities in the structure of individual crystalline platelets of bismuth oxychloride act as centers for color formation upon exposure to light.

DETAILED DESCRIPTION

The process of the present invention is carried out by heating bismuth oxychloride at a temperature in the range of from about 300° to about 800° C. It is an important factor in carrying out the process of the present invention that the temperature and the time at said temperature be coordinated to obtain optimum light stabilization of the bismuth oxychloride without causing substantial sintering of the product. While in its broad aspects temperatures in the range of from about 300° to about 800° C. are effectively employed for longer or shorter periods, the process of the present invention is typically carried out at a temperature in the range of from about 400° to about 700° C. for a period of from about 1 to about 24 hours. The preferred temperature and time at said temperature, of course, will vary depending, among other things, on the particular bismuth oxychloride sample to be treated, the amount of said sample, the desired end use and the heating equipment. It is generally preferred in most cases and under most conditions that the heating procedure be carried out for from about 6 to about 12 hours at a temperature in the range of from about 450° to about 550° C. It is also preferred to avoid temperatures above 700° C. because of the tendency of the product to sinter at such temperatures even when shortened heating periods are employed. While temperatures in the range of from about 300° to about 400° C. may be successfully employed such temperatures are generally considered impractical because of the long heating times required.

The following examples illustrate the effectiveness of the process of the present invention in stabilizing crystalline bismuth oxychloride against light. It is to be understood that the examples are presented for the purpose of illustration only and the invention is not limited to the compositions or methods shown therein.

EXAMPLE 1

A sample of white pearlescent bismuth oxychloride was divided into two approximately equal portions. The first portion was heated in an oven at approximately 600° C. for 1½ hours. The portions were spread on a glass plate and approximately one half of each portion was covered to prevent light exposure while the remaining one half of each portion was exposed for 20 hours to light from an ultraviolet lamp. On completion of the 20 hour exposure period the materials were visually examined. The observations were as follows:

1. Exposed heat treated material
   Color: white—slight color deterioration observed.
2. Unexposed heat treated material
   Color: white — no color deterioration observed.
3. Exposed material (no heat treatment)
   Color: dark grey — substantial color deterioration observed.
4. Unexposed material (no heat treatment)
   Color: white — no color deterioration observed.

EXAMPLE 2

A. Various samples of pearlescent bismuth oxychloride were treated in accordance with the process of the present invention by heating the samples at temperatures in the range of 400°–700° C. for periods of time ranging from 2 to 24 hours. The samples were exposed to light using the test procedure described below. The reflective properties (color) of each sample were measured before and after exposure using the measurement procedure described below.

Test Procedure

A sample of dry powdered bismuth oxychloride was packed into a 3 inch compression sample holder equipped with a quartz lense. The sample was then exposed for 18 hours to near ultraviolet radiation by placing it six inches from an ultraviolet light source (General Electric F-15T8/BLB Black Light). The sample position and radiant flux from the light source were the same for each sample.

Color Measurement Procedure

The reflective properties of bismuth oxychloride are measured using a colorimeter (COLOR-EYE Model LS manufactured by Kollmorgen Corporation of Attleboro, Mass.). The colorimeter is equipped with an 18 inch reflective integrating sphere and is calibrated with a standard reflecting surface so that the standard gives a tristimulus Y value of 1 under illumination from a standard CIE (Commission Internationale de l'Eclairage) illuminant-C light source. The tristimulus value Y of each sample is measured before and after light exposure. The tristimulus Y value is a direct measure of the luminous reflectance relative to the standard reflecting surface. The greater the change in percent Y the greater is the color deterioration of the sample. The results are given in Table 1.

B. The procedure of A above was repeated with the exception that the exposure time was 24 hours instead of 18 hours. The results are given in Table 2.

C. The procedure of A above was repeated with the exception that none of the samples were treated with heat in accordance with the process of the present invention. The results together with the ultraviolet exposure time are given in Table 3.

Table 1

| Sample No. | Initial % Y | % Y After U.V. Exposure | % Y |
|---|---|---|---|
| 1 | 97.0 | 80.0 | 17.0 |
| 2 | 97.9 | 86.6 | 11.3 |
| 3 | 97.0 | 90.8 | 6.2 |
| 4 | 94.5 | 90.6 | 3.9 |
| 5 | 92.2 | 74.9 | 17.3 |
| 6 | 91.4 | 85.6 | 5.8 |
| 7 | 95.6 | 88.3 | 7.3 |
| 8 | 95.7 | 95.8 | 19.9 |
| 9 | 93.5 | 88.7 | 4.8 |
| 10 | 93.0 | 76.3 | 16.7 |
| 11 | 94.5 | 87.7 | 6.8 |
| 12 | 98.1 | 92.9 | 5.2 |
| 13 | 95.6 | 84.8 | 10.8 |
| 14 | 96.2 | 82.3 | 13.9 |
| 15 | 96.1 | 89.0 | 7.1 |
| 16 | 96.3 | 88.3 | 8.0 |
| 17 | 97.1 | 87.3 | 9.8 |
| 18 | 96.4 | 81.1 | 15.3 |
| 19 | 96.5 | 91.3 | 5.2 |
| 20 | 96.8 | 90.3 | 6.5 |
| 21 | 97.5 | 94.1 | 3.4 |
| 22 | 96.9 | 93.9 | 3.0 |
| 23 | 97.0 | 89.1 | 7.9 |
| 24 | 97.0 | 90.3 | 6.7 |
| 25 | 97.4 | 86.5 | 10.9 |
| 26 | 96.9 | 81.8 | 15.1 |
| 27 | 97.5 | 88.7 | 8.8 |
| 28 | 96.4 | 89.9 | 6.5 |
| 29 | 97.0 | 91.0 | 6.0 |
| 30 | 97.1 | 90.0 | 6.2 |
| 31 | 97.0 | 92.1 | 4.9 |
| 32 | 97.0 | 82.3 | 14.7 |
| 33 | 97.0 | 87.5 | 9.5 |
| 34 | 97.7 | 81.3 | 16.4 |
| 35 | 97.0 | 85.9 | 11.1 |
| 36 | 96.8 | 81.2 | 15.6 |
| 37 | 97.9 | 81.3 | 16.6 |

Table 1-continued

| Sample No. | Initial % Y | % Y After U.V. Exposure | % Y |
|---|---|---|---|
| 38 | 97.6 | 81.5 | 16.1 |
| 39 | 96.8 | 84.4 | 12.4 |
| 40 | 97.2 | 84.2 | 13.0 |
| 41 | 97.9 | 80.2 | 17.7 |
| 42 | 97.5 | 82.8 | 14.7 |
| 43 | 96.4 | 81.4 | 15.0 |
| 44 | 97.8 | 79.4 | 18.4 |
| 45 | 97.9 | 82.2 | 15.7 |
| 46 | 96.8 | 82.2 | 14.6 |
| 47 | 97.2 | 81.8 | 15.4 |
| 48 | 98.0 | 84.5 | 14.5 |
| 49 | 96.5 | 85.3 | 11.2 |
| 50 | 96.9 | 85.5 | 11.4 |
| 51 | 97.2 | 93.3 | 3.9 |
| 52 | 96.7 | 92.5 | 4.2 |

Table 2

| Sample No. | Initial % Y | % Y After U.V. Exposure | % Y |
|---|---|---|---|
| 1 | 97.0 | 85.2 | 11.8 |
| 2 | 97.7 | 79.9 | 17.9 |
| 3 | 96.8 | 79.8 | 17.0 |
| 4 | 97.0 | 84.9 | 12.1 |
| 5 | 96.7 | 87.0 | 9.7 |
| 6 | 96.2 | 86.0 | 10.2 |
| 7 | 96.6 | 86.0 | 10.6 |
| 8 | 96.7 | 85.5 | 11.2 |
| 9 | 96.8 | 83.5 | 13.3 |
| 10 | 97.0 | 84.7 | 12.3 |
| 11 | 97.0 | 93.7 | 3.3 |
| 12 | 97.6 | 92.4 | 5.2 |
| 13 | 96.1 | 88.9 | 7.2 |
| 14 | 96.2 | 89.0 | 7.2 |
| 15 | 94.9 | 87.5 | 7.4 |
| 16 | 97.0 | 90.8 | 6.2 |

Table 3

| Sample No. | Initial % Y | % Y After U.V. Exposure | % Y | U.V. Exposure Time |
|---|---|---|---|---|
| 1 | 95.1 | 62.6 | 32.5 | 21½ hours |
| 2 | 96.2 | 53.9 | 42.3 | 21½ hours |
| 3 | 90.2 | 53.0 | 37.2 | 20½ hours |
| 4 | 91.7 | 32.7 | 59.0 | 4½ hours |
| 5 | 92.8 | 50.1 | 42.7 | 18 hours |
| 6 | 93.7 | 51.2 | 42.5 | 18 hours |

The effectiveness of the process of the present invention in improving the stability of bismuth oxychloride against deterioration caused by exposure to light is apparent from the results of these tests. These results show that the change in % Y caused by light exposure of the bismuth oxychloride treated in accordance with the process of the present invention was from 3.0% to 19.9% whereas the change in % Y of the untreated bismuth oxychloride was from 32.5% to 59.0%.

Various modifications and equivalents will be apparent to one skilled in the art and such may be made in the process of the present invention without departing from the spirit or scope thereof. It is therefore to be understood that the invention is to be limited only by the scope of the appended claims.

I claim:

1. A process for the preparation of ultra violet light stable bismuth oxychloride which comprises heating bismuth oxychloride at a temperature in the range of from about 300° C. to about 700° C. for a period of time sufficient to stabilize the bismuth oxychloride against ultra violet light but insufficient to cause substantial sintering of the bismuth oxychloride, said period of time being in the range of from about 1 to about 24 hours.

2. The process of claim 1 wherein the bismuth oxychloride is nacreous bismuth oxychloride.

3. The process of claim 2 wherein the temperature is in the range of from about 400° to about 700° C.

4. The process of claim 3 wherein the temperature is in the range of from about 450° to 550° C. and the heating time is in the range of from about 6 to about 12 hours.

5. Ultra violet light stable nacreous bismuth oxychloride prepared by the process which comprises heating bismuth oxychloride at a temperature in the range of from about 300° to about 700° C. for a period of time sufficient to stabilize the bismuth oxychloride against ultra violet light but insufficient to cause substantial sintering of the bismuth oxychloride, said period of time being in the range of from about 1 to about 24 hours.

6. A process of claim 1 wherein the temperature is in the range of from about 400° to 700° C.

7. The process of claim 6 wherein the temperature is in the range of from about 450° to about 550° C. and the heating time is in the range of from about 6 to about 12 hours.

* * * * *